US006572722B1

(12) United States Patent
Pratt

(10) Patent No.: US 6,572,722 B1
(45) Date of Patent: Jun. 3, 2003

(54) PROCESS FOR AUTOGENEOUSLY BONDING LAMINAE OF A MULT-LAMINA CELLULOSIC SUBSTRATE

(75) Inventor: Michael Sean Pratt, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/444,619

(22) Filed: Nov. 22, 1999

(51) Int. Cl.[7] ................................................ B32B 31/20

(52) U.S. Cl. ....................... 156/209; 156/290; 156/292; 156/308.4; 156/308.6; 156/308.8

(58) Field of Search ................................ 156/209, 219, 156/290, 292, 308.2, 308.4, 308.6, 308.8, 309.3, 553, 555, 582

(56) References Cited

U.S. PATENT DOCUMENTS

| | | | | |
|---|---|---|---|---|
| 3,323,983 A | | 6/1967 | Palmer et al. | 162/362 |
| 3,377,224 A | | 4/1968 | Gresham et al. | 156/209 |
| 3,414,459 A | | 12/1968 | Wells | 161/131 |
| 3,547,723 A | | 12/1970 | Gresham | 156/209 |
| 3,556,907 A | | 1/1971 | Nystrand | 156/470 |
| 3,708,366 A | | 1/1973 | Donnelly | 156/209 |
| 3,738,905 A | | 6/1973 | Thomas | 161/127 |
| 3,867,225 A | | 2/1975 | Nystrand | 156/209 |
| 4,481,243 A | | 11/1984 | Allen | 428/154 |
| 4,483,728 A | | 11/1984 | Bauernfeind | 156/209 |
| 5,468,323 A | | 11/1995 | McNeil | 156/209 |
| 5,543,202 A | | 8/1996 | Clark et al. | 428/154 |
| 5,620,776 A | | 4/1997 | Schulz | 428/156 |
| 5,622,734 A | | 4/1997 | Clark et al. | 425/517 |
| 5,698,291 A | | 12/1997 | Clark et al. | 428/152 |
| 5,846,636 A | | 12/1998 | Ruppel et al. | 428/154 |
| 6,086,715 A | * | 7/2000 | McNeil | 162/132 |

FOREIGN PATENT DOCUMENTS

| | | |
|---|---|---|
| EP | 0905318 A2 | 3/1999 |
| EP | 0955157 A2 | 11/1999 |
| FR | WO 95/35205 | 12/1995 |
| WO | WO 99/33646 A1 | 7/1999 |

* cited by examiner

*Primary Examiner*—James Sells
(74) *Attorney, Agent, or Firm*—Jay A. Krebs; David K. Mattheis; David M. Weirich

(57) ABSTRACT

A process for autogeneously bonding two cellulosic laminae to form a multi-lamina substrate by high pressure lamination. The attachment occurs at selective bond sites wetted with a functional fluid such as water prior to bonding. The process is applicable to multi-lamina substrates formed from laminae treated with chemical softening agents.

20 Claims, 6 Drawing Sheets

PROCESS FOR AUTOGENEOUSLY BONDING LAMINAE OF A MULT-LAMINA CELLULOSIC SUBSTRATE

FIELD OF THE INVENTION

The present invention relates to embossed multi-lamina cellulosic fibrous structures, particularly the process of producing embossed multi-lamina cellulosic fibrous structures having selective autogeneous bond sites.

BACKGROUND OF THE INVENTION

Cellulosic fibrous structures are a staple of everyday life. Cellulosic fibrous structures such as tissue paper are used as consumer products for paper towels, toilet tissue, facial tissue, napkins and the like. The large demand for such paper products has created a demand for improved versions of the products and the methods of their manufacture.

Manufacturers have concentrated improvements in softness, bulkiness, absorbency and aesthetics of cellulosic fibrous structures. For softness, attention has been primarily focused on chemical softening agents. For bulkiness, absorbency, and aesthetics, manufacturers have centered on multi-lamina substrates, particularly embossed multi-lamina substrates.

There have been numerous attempts to reduce the abrasive effects of tissue products through the addition of chemical softening agents (also referred to as "chemical softeners"). As used herein, the term "chemical softening agent" refers to any chemical ingredient which improves the tactile sensation perceived by the consumer who holds a particular paper product and rubs it across the skin. Although somewhat desirable for towel products, softness is a particularly important property for facial and toilet tissues. Such tactilely perceivable softness can be characterized by, but is not limited to, friction, flexibility, and smoothness, as well as subjective descriptors, such as a feeling like velvet, silk or flannel. Suitable materials include those which impart a lubricious feel to tissue. This includes, for exemplary purposes only, basic waxes such as paraffin and beeswax and oils such as mineral oil and silicone oil as well as petrolatum and more complex lubricants and emollients such as quaternary ammonium compounds with long alkyl chains, tertiary amines, functional silicones, fatty acids, fatty alcohols and fatty esters.

Multi-lamina laminate substrates are well known in the art of consumer products. Such products are typically cellulosic fibrous structures having more than one, typically two, laminae superimposed in face-to-face relationship to form a laminate. It is known in the art to emboss the laminate for aesthetic purposes and to produce bonds between the laminae. Embossing can also increase the surface area of the laminae thereby enhancing their bulk and water holding capacity.

Embossing is typically performed by one of two processes, knob-to-knob embossing or nested embossing. Knob-to-knob embossing consists of axially parallel rolls juxtaposed to form a nip between the crests of the embossing knobs on opposing rolls. Nested embossing consists of axially parallel rolls juxtaposed to form a nip where the embossing knobs on one roll mesh between the embossing knobs of the other roll. Examples of knob-to-knob embossing and nested embossing are illustrated in the prior art by U.S. Pat. No. 3,414,459 issued Dec. 3, 1968 to Wells and commonly assigned; U.S. Pat. No. 3,547,723 issued Dec. 15, 1970 to Gresham; U.S. Pat. No. 3,556,907 issued Jan. 19, 1971 to Nystrand; U.S. Pat. No. 3,708,366 issued Jan. 2, 1973 to Donnelly; U.S. Pat. No. 3,738,905 issued Jun. 12, 1973 to Thomas; U.S. Pat. No. 3,867,225 issued Feb. 18, 1975 to Nystrand and U.S. Pat. No. 4,483,728 issued Nov. 20, 1984 to Bauernfeind.

During the embossing process, the laminae are fed through separate nips formed between separate embossing rolls and pressure rolls where embossing knobs on the embossing rolls produce compressed regions in the laminae. The two laminae are then fed through a common nip formed between the embossing rolls where the embossing knobs on the two rolls bring the laminae together in a face-to-face contacting relationship.

Nested embossing has proven to be the preferred process for producing embossed multi-lamina laminates. Products produced by nested embossing exhibit a softer more quilted appearance that is maintained throughout the balance of the converting process, and packaging. With nested embossing, the crests of the embossing knobs on one embossing roll intermesh with the embossing knobs on the opposing embossing roll at the nip formed between the two rolls. This causes the patterns produced on the two laminae transported therebetween to intermesh enabling the embossed sites produced on one lamina to provide support for the embossed sites produced on the other lamina.

With nested embossing an adhesive applicator roll is typically aligned axially parallel with one of the two embossing rolls forming a nip therewith upstream of the nip formed between the two embossing rolls. The adhesive applicator roll transfers adhesive to the lamina on the embossing roll at the crests of the embossing knobs. The crests of the embossing knobs typically do not touch the perimeter of the opposing roll at the nip formed therebetween necessitating the addition of a marrying roll to apply pressure for lamination. The marrying roll forms a nip with the same embossing roll forming the nip with the adhesive applicator roll, downstream of the nip formed between the two embossing rolls. Typical marrying rolls have a smooth continuous surface resulting in the lamination of every potential laminating point as shown in U.S. Pat. No 3,867,225 issued Feb. 18, 1975 to Nystrand.

A preferred means for embossing and bonding multiple laminae of tissue in a face-to-face relationship involves embossing autogeneously (without adhesives) by high pressure lamination. With high pressure lamination, the adhesive applicator roll is eliminated and the marrying roll is replaced with a steel anvil roll. In addition to bonding the laminae, high pressure lamination produces a visually distinctive embossment pattern exhibiting a glassine appearance which is decoratively pleasing. High pressure lamination is disclosed in U.S. Pat. No. 3,377,224 issued Apr. 9, 1968 to Gresham et al and U.S. Pat. No. 3,323,983 issued Sep. 8, 1964 to Palmer. Both patents are incorporated herein by reference.

The High pressure lamination typically requires pressures ranging from about 40,000 psi to about 80,000 psi to produce adequate bond strength between the laminae. For laminae treated with chemical softening agents, the required pressures can exceed 150,000 psi.

High laminating pressures can induce fatigue on the surface of an embossing roll limiting the useful life of the roll. What's more, high laminating pressures can damage the substrate by tearing or puncturing the laminae. Thus, there is a desire to minimize the lamination pressure required for bonding laminae by high pressure lamination, particularly, laminae treated with chemical softening agents.

U.S. Pat. No. 4,481,243 issued Nov. 6, 1984 to Allen, incorporated herein by reference, discloses a tissue comprising a planar substrate carrying an emollient where the substrate comprises at least two laminae united by embossments without adhesives. Allen addressed the issue of bonding, without adhesives, laminae treated with emollient by limiting the embossed sites to regions free of the emollient.

The present invention provides a means for bonding laminae by high pressure lamination at reduced pressures by adding a functional fluid such as water to selective bond sites prior to bonding. The process is capable of autogeneously bonding laminae uniformly treated with chemical softeners at reasonable pressures without causing damage to the laminae or reducing the useful life of the embossing roll.

SUMMARY OF THE INVENTION

The invention provides a process for producing a multi-lamina cellulosic substrate bonded at discrete bond sites by high pressure lamination at reduced pressures. A fluid applicator roll operates in conjunction with a pattern roll to increase the local moisture level at selective bond sites prior to high pressure lamination. The selective bond sites may be continuous or discrete. The process is applicable to multi-lamina substrates having laminae previously treated with chemical softening agents.

In one embodiment, a fluid applicator roll is juxtaposed axially parallel to a pattern roll forming a fluid transfer nip therewith. The pattern roll is also juxtaposed axially parallel to a steel anvil roll forming a bonding nip therewith. A first lamina is transported relative to the fluid transfer nip where it is selectively wetted at continuous or discrete locations by the fluid applicator roll. The first lamina is then transported to the bonding nip where it is bonded in a face-to-face relationship with a second lamina by high pressure lamination.

In an alternate embodiment, the process comprises providing a first lamina embosser and a second lamina embosser. The first lamina embosser comprises a first pressure roll juxtaposed axially parallel to a first embossing roll forming a first embossing nip therewith and the second lamina embosser comprises a second pressure roll juxtaposed axially parallel to a second embossing roll forming a second embossing nip therewith. The first and second embossing rolls comprise a plurality of radially oriented embossing knobs projecting from a periphery to form crests. The first lamina embosser and the second lamina embosser are positioned in a parallel arrangement such that the first embossing roll forms an intermeshing nip with the second embossing roll. A fluid applicator roll is provided juxtaposed axially parallel to the first embossing roll forming a fluid transfer nip therewith upstream of the intermeshing nip. An anvil roll is provided juxtaposed axially parallel with the first embossing roll forming a bonding nip therewith downstream of the intermeshing nip.

As the first and second laminae are transported relative to the first and second lamina embossers, the fluid applicator roll applies water to the first lamina at selective locations corresponding to embossed sites produced at the first embossing nip. The first and second laminae are transported to the intermeshing nip and assembled in a nested a face-to-face relationship forming a multi-lamina substrate. The multi-lamina substrate is then transported to the bonding nip where the two laminae are bonded at the wetted embossed sites by high pressure lamination.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Definitions

Figure 1:
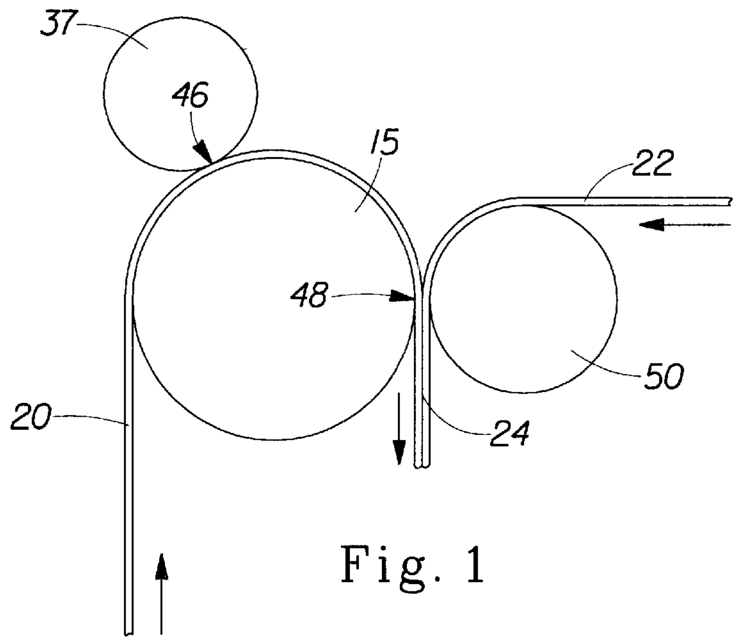
FIG. 1 is a schematic side elevational view of an apparatus used to perform high pressure lamination according to the present invention.

As used herein, the following terms have the following meanings:

"Upstream" is that portion of a process stream that has not yet entered the unit under consideration.

"Downstream" is that portion of a process stream that has already passed through the unit under consideration.

"Embossing" refers to the process of deflecting a relatively small portion of a cellulosic fibrous structure normal to its plane and impacting the projected portion of the fibrous structure against a relatively hard surface to permanently disrupt the fiber to fiber bonds.

A "nip" is the line representing the point of contact or the minimum distance between the periphery of any pair of rolls having parallel axes between which paper passes.

A "lamina" is a layer of cellulosic fibers which may comprise a single ply or multiple plies of tissue.

"Selectively bonded" means the mating surfaces between two lamina superimposed in a face-to-face relationship are partially joined at sites covering less than the entire mating surfaces.

"Discrete," means the adjacent sites are not contiguous.

"Essentially continuous" means extending substantially throughout a plane in both of its principal directions.

"Semi-continuous" means extending substantially throughout a plane in one dimension.

An "indicia" is a distinctive marking, exhibiting a decorative aspect.

A "latticework" is a pattern of small intersecting diagonal or zigzag segments or angles.

A "cell" is a unit of a two-dimensional array comprising a group of individual enclosures.

"Autogeneous bonding" is the union of mating surfaces without the use of adhesives.

A "functional liquid" is a non-adhesive liquid capable of participating in hydrogen bonding and having the ability to wet and mobilize fibers into proximity of one another for such hydrogen bonding. Examples of such functional liquids includes water and water soluble polyhydroxy compounds such as glycerol and polyglycerols, and polyoxyethylene and polyoxypropylene. Functional liquids may also include mixtures of these polyhydroxy compounds such as mixtures of glycerol and polyglycerols, mixtures of glycerol and polyoxyethylenes, and mixtures of polyglycerols and polyoxyethylenes.

The specification contains a detailed description of the laminating system of the present invention and the process which utilizes the system for producing a multi-lamina cellulosic substrate. The process includes autogeneously bonding the laminae at selective bond sites by high pressure lamination.

The multi-lamina cellulosic substrate produced by the process of the present invention has functional characteristics of softness, absorbency, and drape as well as aesthetically pleasing decorative attributes. Such aesthetically pleasing features include patterns of indicia displaying decorative images providing a high quality cloth-like appearance and particularly, a softer, more quilted look.

The laminae forming the multi-lamina cellulosic substrate are bonded at selective locations to enhance softness, improve drapeness, and provide aesthetic attributes. The aesthetic attributes produced by selective bonding can inhibit dissipation caused by compressive forces, humidity, and absorption.

The selective bonding can be limited to discrete, essentially continuous, or semi-continuous bond sites. For discrete bond sites, bonding may be limited to indicia to produce more permanent decorative images. For essentially continuous bond sites, bonding may be limited to a lattice work to produce a more definite group of cells. For semi-continuous bond sites, bonding may be limited to patterns providing a rippled appearance.

The laminae forming the multi-lamina substrate may be treated with chemical softening agents to enhance the perceivable softness of the laminae. Such chemical softening agents include, for exemplary purposes only, basic waxes such as paraffin and beeswax and oils such as mineral oil and silicone oil as well as petrolatum and more complex lubricants, lotions, emollients and debonders such as quaternary ammonium compounds with long alkyl chains, tertiary amines, functional silicones, fatty acids, fatty alcohols and fatty esters.

While chemical softening agents enhance the tactile sensation perceived by the consumer, their presence causes process limitations in the formation of the multi-lamina substrate particularly where high pressure lamination is used to bond the laminae. The present invention overcomes such limitations by increasing the local moisture level at selective bond sites prior to joining the laminae by high pressure lamination.

Illustrated in FIG. 1, is a system for autogeneously bonding the laminae of a multi-lamina substrate at selective sites by high pressure lamination. A fluid applicator roll 37 is juxtaposed axially parallel to a pattern roll 15 forming a fluid transfer nip 46 therewith. The pattern roll 15 is also juxtaposed axially parallel to a steel anvil roll 50 forming a bonding nip 48 therewith. A first lamina 20 is transported relative to the pattern roll 15 to the fluid transfer nip 46. At the fluid transfer nip 46, the fluid applicator roll 37 selectively wets the first lamina 20 with a functional liquid, previously defined, at selective sites. Downstream of the fluid transfer nip 46, the first lamina 20 is assembled in a face-to-face relationship with a second lamina 22. The first lamina 20 and the second lamina 22 are transported to the bonding nip 48 where the two laminae 20, 22 are bonded at the selective sites by high pressure lamination.

Figure 2:
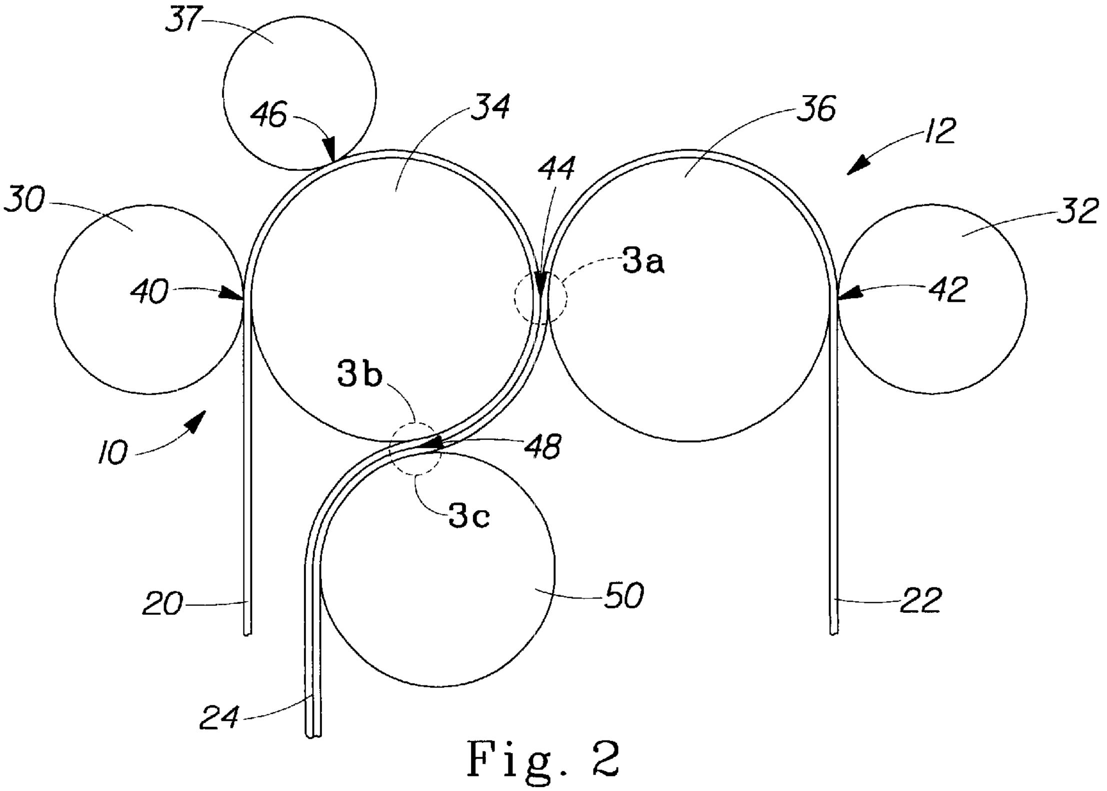
FIG. 2 is a schematic side elevational view of an apparatus used to perform nested embossing and high pressure lamination of two laminae according to the present invention.

Illustrated in FIG. 2 is an embossing and laminating system used to manufacture cellulosic fibrous structures for consumer paper products. The system depicted performs a process referred to in the prior art as nested embossing. In nested embossing two laminae 20 and 22 are embossed between embossers comprising a first lamina embosser and a second lamina embosser. The first lamina embosser 10 includes a first embossing roll 34 juxtaposed axially parallel to a first pressure roll 30 forming a first embossing nip 40 therebetween. The second lamina embosser 12 includes a second embossing roll 36 juxtaposed axially parallel to a s second pressure roll 32 forming a second embossing nip 42 therebetween. The axes of the first lamina embosser and the second lamina embosser are juxtaposed parallel such that the first and second embossing rolls form an intermeshing nip 44.

After embossing, one of the laminae 20 or 22 may have a functional fluid such as water applied to the resulting crests 27 of the embossed sites 26 by a fluid applicator roll 37 in order to locally increase the moisture content of the respective lamina at selective locations. Although the fluid applicator roll 37 may be disposed in a parallel arrangement with either the first lamina embosser 10 or the second lamina embosser 12, the embodiment illustrated in FIG. 2 shows the fluid applicator roll 37 forming the fluid transfer nip 46 with the first embossing roll 34 of the first lamina embosser 10. The fluid applicator roll wets first lamina at selective sites corresponding to the embossing knobs 33 on the first embossing roll 34.

Figure 3A:
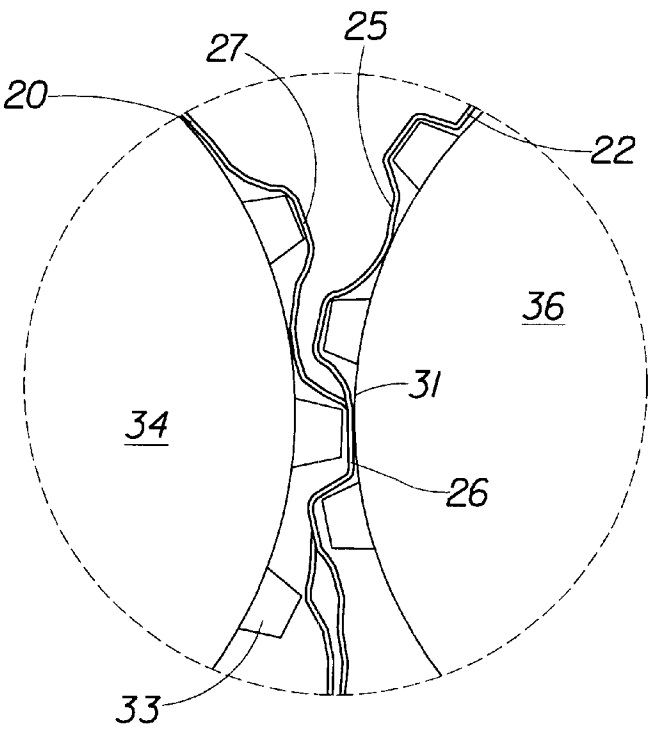
FIG. 3*a* is a side view of a nip formed between the two embossing rolls displayed in FIG. 2.

Once the first lamina 20 exits the fluid transfer nip , the first lamina 20 and the second lamina 22 are transported to the intermeshing nip 44 where the two laminae 20, 22 are assembled in a face-to-face relationship forming a multi-lamina substrate 24. As shown in FIG. 3*a*, the patterns on each of the two embossing rolls 34, 36 are arranged such that the embossing knobs 33 on one roll mesh between embossing knobs 33 on the opposing roll so that the corresponding embossed sites 26 on the first lamina fit within the corresponding nonembossed regions 25 on the second lamina and vice versa.

Figure 3B:
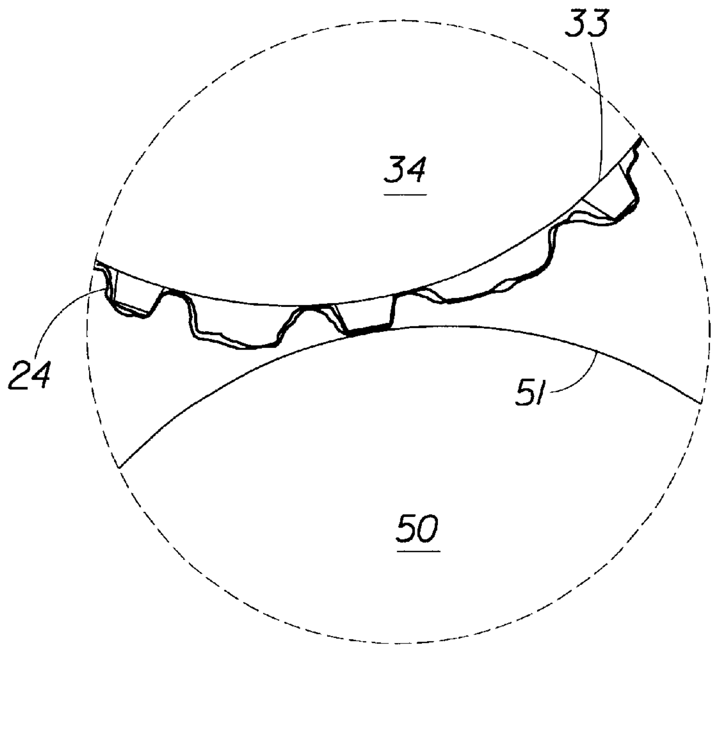
FIG. 3*b* is a side view of a high pressure lamination nip formed between a embossing roll and the periphery of the steel anvil roll displayed in FIG. 2.

Upon exiting the intermeshing nip 44, the multi-lamina substrate 24 is transported to a bonding nip 48 formed between the first embossing roll 34 and a steel anvil roll 50 disposed axially parallel therewith. As shown in FIG. 3*b*, the embossing knobs 33 on the first embossing roll 34 form the bonding nip 48 with the periphery 51 of the steel anvil roll 50. The bonding nip 48 formed therebetween produces high lamination pressures to the multi-lamina substrate 24 forming bonds therebetween. Such pressures are determined by the following:

$$\text{Nip Pressure} = \frac{F}{L * W * L_A}$$

Where

F=Total net force applied through the axes of the rolls via hydraulic cylinders and the weight of the rolls.

L=Face length of the rolls.

W=Nip width, the width of impression on nip width carbon paper such as Beloit Manhattan Division nip impression kit carbon paper for covered rolls.

$L_A$=Average fraction of contact area in the nip between the crests of the embossing knobs and the surface of the anvil roll with respect to the total projected surface area of the nip where the total projected surface area of the nip is equal to L*W.

For typical cellulosic laminae the pressures can range from a low limit of about 20,000 psi or a low limit of about 25,000 psi, to a high limit of about 40,000 psi or a high limit of about 35,000 psi. For cellulosic laminae treated with chemical softening agents, these pressures can range from about 40,000 psi to about 60,000 psi.

The bonds formed between the two laminae 20, 22 are generally attributed to vander Waals' forces as well as mechanical bonding (e.g., entangled, interlocked fibers). However, not to be bound by theory, an additional portion may be attributed to hydrogen bonding induced by the combination of the high pressure loads and increased moisture levels at the discrete bond sites provided by the fluid applicator roll.

The pattern roll 15 illustrated in FIG. 1 and the embossing rolls 34, 36 illustrated in FIG. 2 are typically steel and comprise embossing knobs 33 extending radially outward from a periphery 31 to form crests 27. The embossing knobs 33 are typically arranged to form a decorative pattern which is compressed onto the corresponding lamina at the corresponding embossing nips 40, 42 and bonding nip 48.

Pressure rolls 30, 32 are typically made of soft rubber and are loaded against the embossing rolls 34,36. As the respective laminae 20, 22 pass between the first and second embossing nips 40, 42 the decorative patterns disposed on the embossing rolls 34, 36 are imparted to the laminae 20, 22.

Figure 4A:
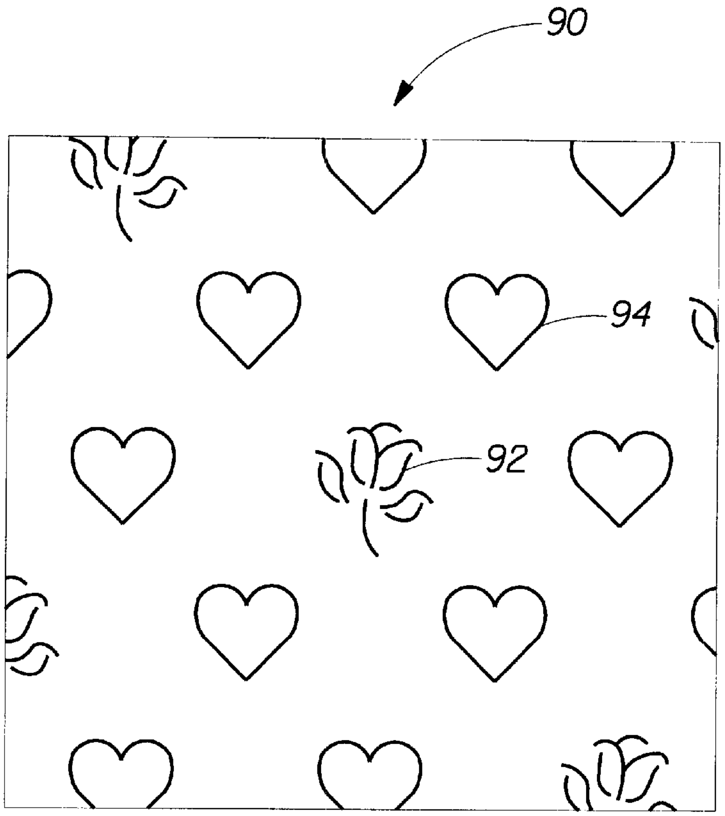
FIG. 4*a* is a plan view of a decorative pattern formed on the embossing roll comprising linear flower shaped indicia and heart shaped indicia.
Figure 4B:
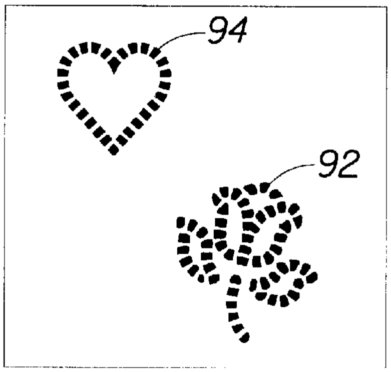
FIG. 4*b* is a plan view of the indicia shown in FIG. 4*a* comprising discontinuous flower and heart shaped patterns.
Figure 5A:
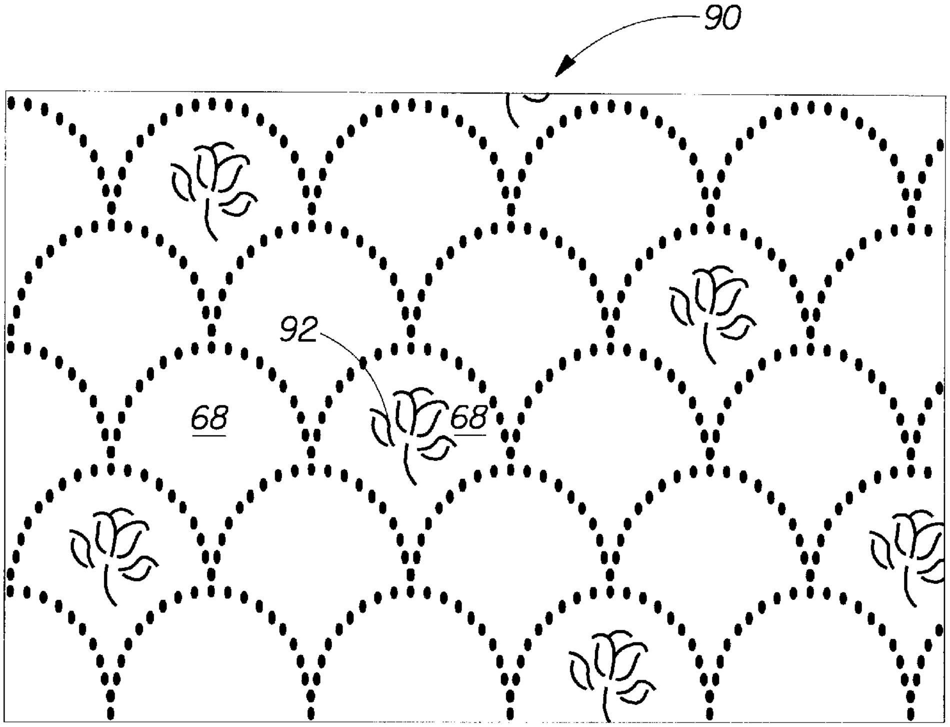
FIG. 5*a* is a plan view of a decorative pattern formed on the embossing roll comprising a lattice work of cells having a flower shaped indicia disposed in less than all of the cells.
Figure 5B:
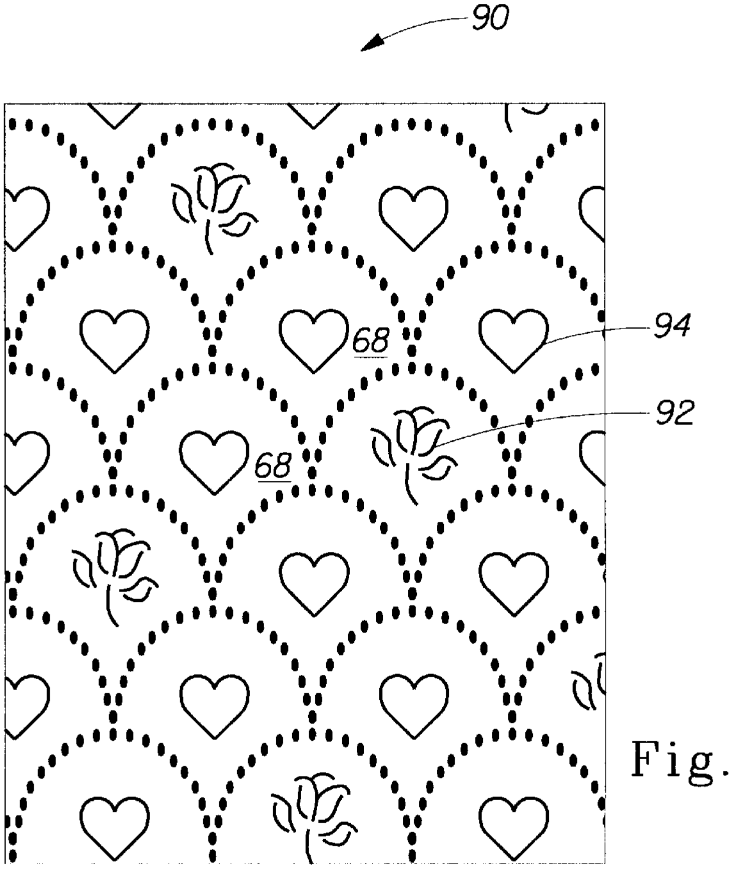
FIG. 5*b* is plan view of the lattice work of cells in FIG. 5*a* with heart shaped indicia disposed in the empty cells depicted in FIG. 5*a*.

For the present invention, the decorative patterns 90 disposed on the embossing rolls 34, 36 may comprise a plurality of indicia forming decorative images such as flowers 92 and heart shapes 94 as shown in FIG. 4*a*. The embossing knobs 33 forming the indicia may be discontinuous forming flowers and heart shapes as shown in FIG. 4*b*. In an alternate embodiment shown in FIGS. 5*a* and 5*b*, the flowers 92 and heart shapes 94 may be disposed in a latticework of cells 68 formed by rows of arcuate embossing knobs 33.

Figure 6A:
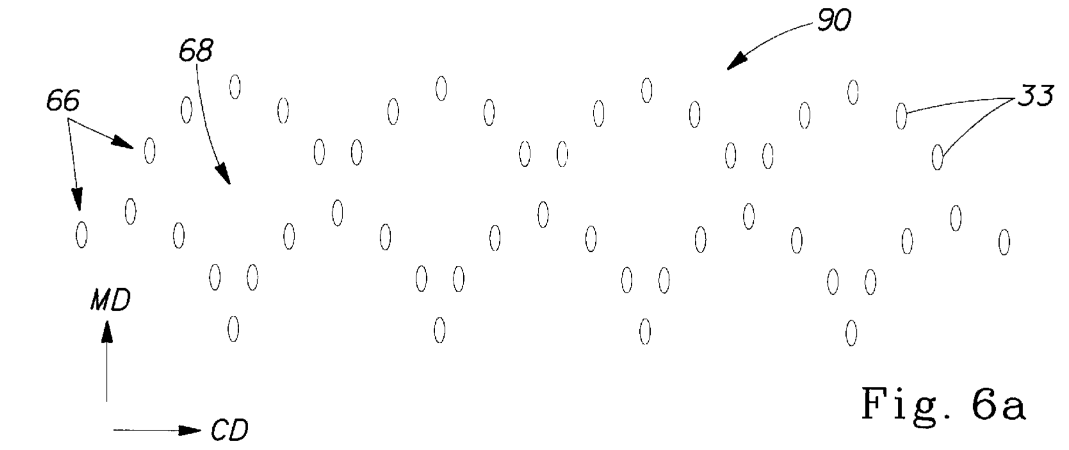
FIG. 6*a* is a fragmentary plan view of the decorative pattern disposed on the first embossing roll comprising a latticework of cells formed by single arcuate rows of embossing knobs.
Figure 6B:
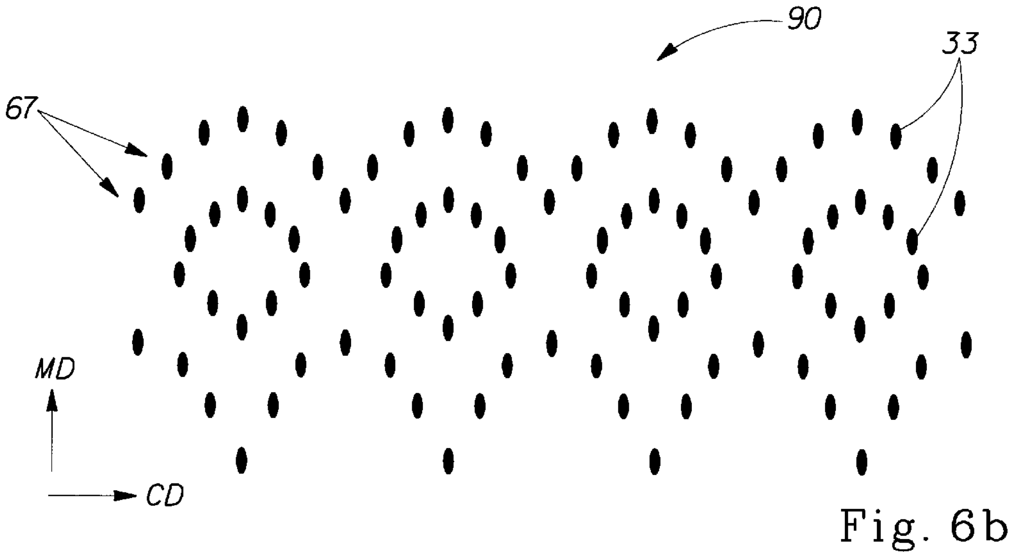
FIG. 6*b* is a fragmentary plan view of the decorative pattern disposed on the second embossing roll comprising a latticework of cells formed by double arcuate rows of embossing knobs.
Figure 6C:
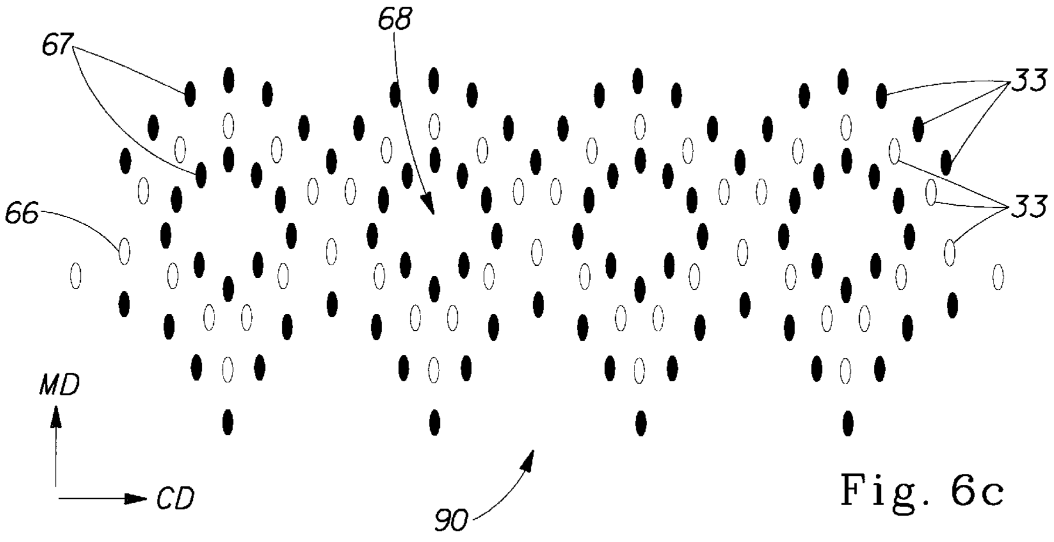
FIG. 6*c* is a fragmentary plan view of the embossment pattern produced on the first lamina by the pattern on first embossing roll illustrated in FIG. 6*a* nested within the embossment pattern produced on the second lamina by the second embossing roll illustrated in FIG. 6*b*.

In still another embodiment, the decorative pattern 90 on the first embossing roll may comprise a latticework of cells 68 formed from n arcuate rows 66 of embossing knobs 33 as shown in FIG. 6*a*, while the decorative pattern on second embossing roll 36, shown in FIG. 6*b*, comprises a latticework of cells formed from n+1 arcuate rows 67 of embossing knobs 33. For this embodiment, the pattern 90 on the two embossing rolls intermesh so that the n rows 66 of embossing knobs 33 on the first roll 34 fit within the n+1 rows 67 of embossing knobs 33 on the second roll 36. FIG. 6*c* illustrates the intermeshing that occurs as the first and second laminae 20, 22 are transported through the intermeshing nip 44.

The fluid applicator roll 37 may be used in conjunction with a pick-up and metering roll (not shown) or a gravure roll (not shown), both of which are commonly used in the papernaking industry in systems utilizing glue application systems. The external surface of the fluid applicator roll 37 may comprise a pattern of essentially continuous, semi-continuous, or discrete land areas synchronized with the pattern disposed on the outer surface of the pattern roll 15, shown in FIG. 1, or the outer surface of the embossing roll 34, shown in FIG. 2, to selectively limit the transfer of fluid to the first lamina 20 at the fluid transfer nip 46. Alternatively, the external surface of the fluid applicator roll 37 may be smooth whereby fluid is transferred to the smooth surface (via the metering roll or the gravure roll) in a pattern synchronized with the pattern on the pattern roll.

The steel anvil roll 50 typically comprises a smooth external surface forming a bonding nip with the corresponding pattern roll 15 or first embossing roll 34. For this embodiment, the bonding nip 48 joins the laminae at selective sites duplicating the pattern on either the pattern roll 15 shown in FIG. 1 or the first embossing roll 34 shown in FIG. 2.

Figure 3C:
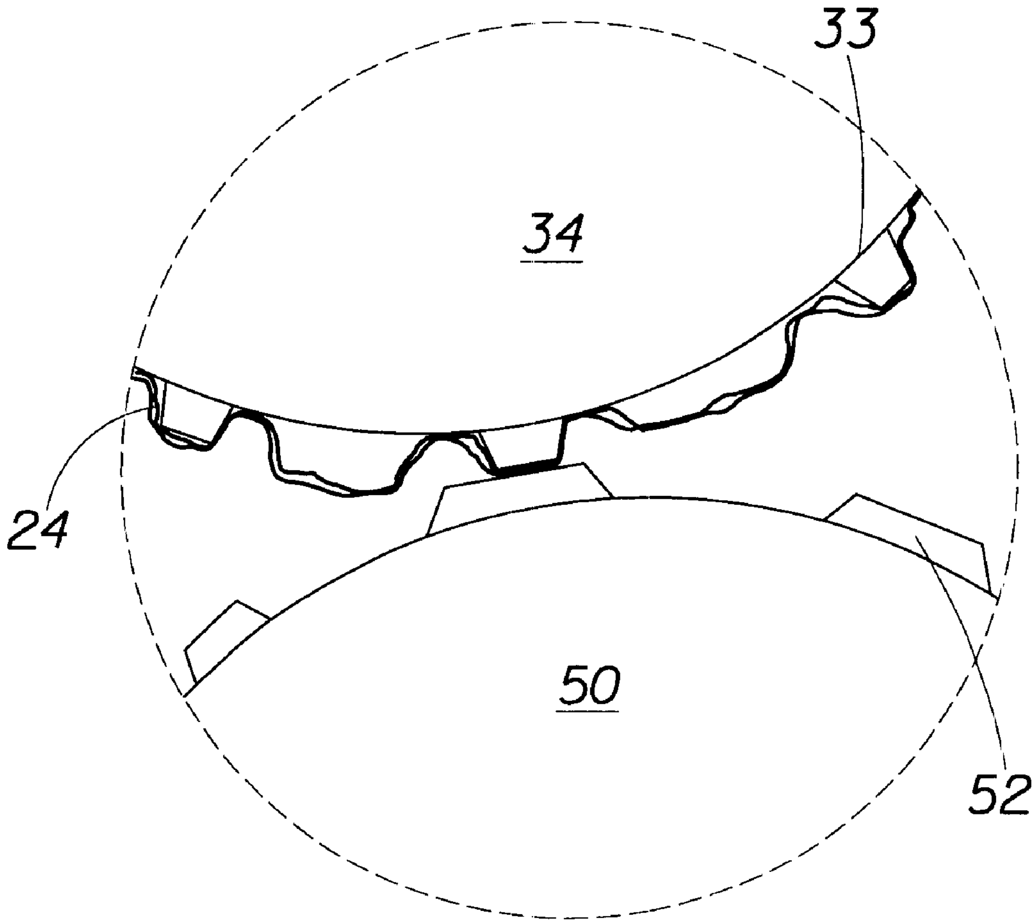
FIG. 3*c* is a side view of a high pressure lamination nip formed between a embossing roll and land areas on the steel anvil roll displayed in FIG. 2.

In one embodiment illustrated in FIG. 3*c*, the anvil roll 50 includes land areas 52 which correspond to and slightly exceed the dimension associated with the crests 27 of selective interfacing embossing knobs 33 forming the bonding nip 48. For this embodiment, the land areas 52 can correspond to the embossing knobs forming the most aesthetically pleasing indicia on the first embossing roll 34 thereby limiting the discrete bond sites to such indicia. For example, a laminate having an embossment pattern comprising more than one type of indicia may have discrete bonds sites limited to one indicia type. The resulting glassine appearance of the bonded indicia distinguishes the indicia from the nonbonded indicia, enhancing the decorative quality of the laminate.

While particular embodiments of the present invention have been illustrated and described, it would be obvious to those skilled in the art that various other changes and modifications can be made without departing from the spirit and scope of the invention. It is intended to cover in the appended claims all such changes and modifications that are within the scope of the invention.

What is claimed is:

1. A process for autogeneously bonding two laminae comprising the steps of:

providing a pattern roll;

providing a fluid applicator roll juxtaposed axially parallel to the pattern roll and forming a fluid transfer nip therewith;

providing a steel anvil roll juxtaposed axially parallel to the pattern roll forming a bonding nip therewith;

providing a first lamina and a second lamina;

transporting the first lamina relative to the fluid transfer nip whereby a functional fluid is applied to the first lamina at selective sites;

transporting the second lamina relative to the first lamina;

assembling the first lamina in a face-to-face relationship with the second lamina; and transporting the assembled first and second lamina to the bonding nip whereby the two laminae are selectively bonded at some of the selective sites.

2. The process of claim 1, wherein the first pattern roll comprises a periphery and a plurality of radially oriented embossing knobs projecting from the periphery to form crests, the embossment knobs are arranged in a selective pattern which is compressed onto the first and second lamina at the bond nip.

3. The process of claim 1 wherein the functional fluid is water.

4. The process of claim 1, wherein the first lamina and the second lamina are treated with a chemical softening agent.

5. The process of claim 4, wherein the pressure produced at the bonding nip ranges from 40,000 psi to about 60,000 psi.

6. The process of claim 1, wherein the pressure produced at the bonding nip ranges from 20,000 psi to about 40,000 psi.

7. The process of claim 2 wherein the fluid applicator roll comprises a periphery having land areas disposed thereon, the land areas correspond to the selective pattern on the first pattern roll limiting the fluid transfer to the selective sites on the first lamina.

8. The process of claim 1 wherein first and second lamina are bonded at all of the selective sites.

9. A process for autogeneously bonding two laminae comprising the steps of:

providing a first lamina embosser and a second lamina embosser, the first lamina embosser comprising a first pressure roll juxtaposed axially parallel to a first embossing roll forming a first embossing nip therebetween , the second lamina embosser comprising a second pressure roll juxtaposed axially parallel to a second embossing roll forming a second embossing nip therebetween, the first lamina embosser positioned parallel to the second lamina embosser such that the first embossing roll forms a intermeshing nip with the second embossing roll;

providing one fluid applicator roll juxtaposed axially parallel to the first embossing roll forming a fluid transfer nip upstream of the intermeshing nip;

providing an anvil roll juxtaposed axially parallel to the first embossing roll forming a bonding nip downstream of the intermeshing nip;

providing a first lamina and a second lamina;

interposing the first lamina between the first embossing nip of the first lamina embosser;

interposing the second lamina between the second embossing nip of the second lamina embosser;

concurrently rotating the rolls of the first and the second lamina embossers whereby the first lamina and the second lamina are transported relative to the rolls;

interposing the first lamina between the fluid transfer nip wherein the fluid applicator roll transfers a functional fluid to selective sites on the first lamina;

interposing the first lamina and the second lamina between the intermeshing nip, assembling the first lamina and the second lamina in a face to face relationship forming a multi-lamina substrate; and transporting the multi-lamina substrate relative to the bonding nip whereby the first and second laminae are bonded at some of the selective sites.

10. The process of claim 9, wherein each first and second embossing roll comprises a periphery and a plurality of radially oriented embossing knobs projecting from the periphery forming crests, the embossing knobs create a pattern which is compressed onto the first or the second lamina at the corresponding first or second embossing nip.

11. The process of claim 10, wherein the embossing knobs on at least one of the embossing rolls form a plurality of indicia.

12. The process of claim 11, wherein the embossing knobs on at least one of the embossing rolls forms a lattice work of cells.

13. The process of claim 12, wherein the plurality of indicia are disposed within the lattice work of cells.

14. The process of claim 11, wherein the plurality of indicia exhibit two or more decorative patterns.

15. The process of claim 11 wherein the steel anvil roll comprises a periphery having land areas disposed thereon, the land areas correspond to some indicia on the first embossing roll at the bonding nip.

16. The process of claim 9, wherein the first lamina and the second lamina are treated with a chemical softening agent.

17. The process of claim 16 wherein the pressure produced at the bonding nip ranges from 40,000 psi to about 60,000 psi.

18. The process of claim 9 wherein the pressure produced at the bonding nip ranges from 20,000 psi to about 40,000 psi.

19. The process of claim 9 wherein the functional fluid is water.

20. The process of claim 9 wherein the first and second laminae are bonded at all of the selective sites.

* * * * *

UNITED STATES PATENT AND TRADEMARK OFFICE

CERTIFICATE OF CORRECTION

PATENT NO. : 6,572,722 B1 Page 1 of 1
DATED : June 3, 2003
INVENTOR(S) : Michael Sean Pratt It is certified that error appears in the above-identified patent and that said Letters Patent is hereby corrected as shown below:

Title page, Item [54] and Column 1, line 2,
Title, "MULT-LAMINA" should read -- MULTI-LAMINA --.

Column 8,
Line 4, "papernaking" should read -- papermaking --.

Signed and Sealed this

Sixteenth Day of December, 2003

JAMES E. ROGAN
*Director of the United States Patent and Trademark Office*